(12) United States Patent
Thomas et al.

(10) Patent No.: US 7,874,578 B2
(45) Date of Patent: Jan. 25, 2011

(54) EXTENDABLE STABILIZER FOR AIRBAG

(75) Inventors: Scott D. Thomas, Novi, MI (US);
Robert L. Demick, Macomb Township, MI (US); Anthony P. Clark, Melbourne (AU); Stuart L. Smith, Melbourne (AU)

(73) Assignee: GM Global Technology Operations, Inc., Detroit, MI (US)

( * ) Notice: Subject to any disclaimer, the term of this patent is extended or adjusted under 35 U.S.C. 154(b) by 57 days.

(21) Appl. No.: 12/402,679

(22) Filed: Mar. 12, 2009

(65) Prior Publication Data

US 2010/0230937 A1 Sep. 16, 2010

(51) Int. Cl.
*B60R 21/207* (2006.01)
*B60R 21/215* (2006.01)
(52) U.S. Cl. ............... 280/728.3; 280/730.2; 280/743.2
(58) Field of Classification Search ............... 280/728.3, 280/730.2, 743.2; *B60R 21/21, 21/215, 21/207*
See application file for complete search history.

(56) References Cited

U.S. PATENT DOCUMENTS 5,556,126 A * 9/1996 Lee .......................... 280/728.3
5,653,461 A * 8/1997 Fischer .................... 280/728.3

* cited by examiner

*Primary Examiner*—Paul N Dickson
*Assistant Examiner*—Keith Frisby

(57) ABSTRACT

Apparatus for stabilizing the deployment of an airbag includes an airbag housing in which a folded up airbag is housed. The housing has an open side through which the airbag is deployed and a door is pivoted to the housing and is pivoted open by the deploying airbag. An extension panel is mounted on the door by a track mechanism so that the extension panel is movable between a normal retracted position along side the door and an extended position in which the extension panel extends beyond the door. An extension mechanism for causes the extension panel to be moved to the extended position when the airbag is deploying so that the door and the extension panel direct and stabilize the deploying airbag.

20 Claims, 8 Drawing Sheets

US 7,874,578 B2

EXTENDABLE STABILIZER FOR AIRBAG

FIELD OF THE INVENTION

The present invention relates to an airbag in a motor vehicle and more particularly provides a stabilizer for guiding the deployment of the airbag.

BACKGROUND OF THE INVENTION

It is well known in motor vehicles to provide an airbag which is normally stored in a concealed position and then inflates rapidly in the event of a sensed vehicle deceleration.

The airbag is typically stored in an airbag housing which is mounted on the vehicle structure, for example the vehicle seat. An inflator is provided in the housing and supplies inflation gas which causes the airbag to rapidly inflate. As the airbag inflates it exits the housing and pushes open a door or a membrane that serves to cover up and conceal the folded up airbag.

Optimal performance of the airbag is obtained when the direction and speed of deployment is controlled in a manner to assure that the airbag reaches to fully inflated position in a rapid fashion.

It would be desirable to provide a mechanism for directing and stabilizing the direction of deployment of the airbag as the airbag inflates out of the airbag housing.

SUMMARY OF THE INVENTION

An airbag assembly includes an airbag housing in which a folded up airbag is housed. The housing has an open side through which the airbag is deployed. A door is pivoted to the housing and closes the open side and overlies the folded up airbag. The door is pivoted open by the deploying airbag. An extension panel is mounted on the door by a track mechanism so that the extension panel is movable between a normal retracted position alongside the door and an extended position in which the extension panel extends beyond the door. An extension mechanism is provided for causing the extension panel to be moved to the extended position as the airbag is deploying so that the combined length of the door and the extension panel will direct and stabilize the position of the deploying airbag.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
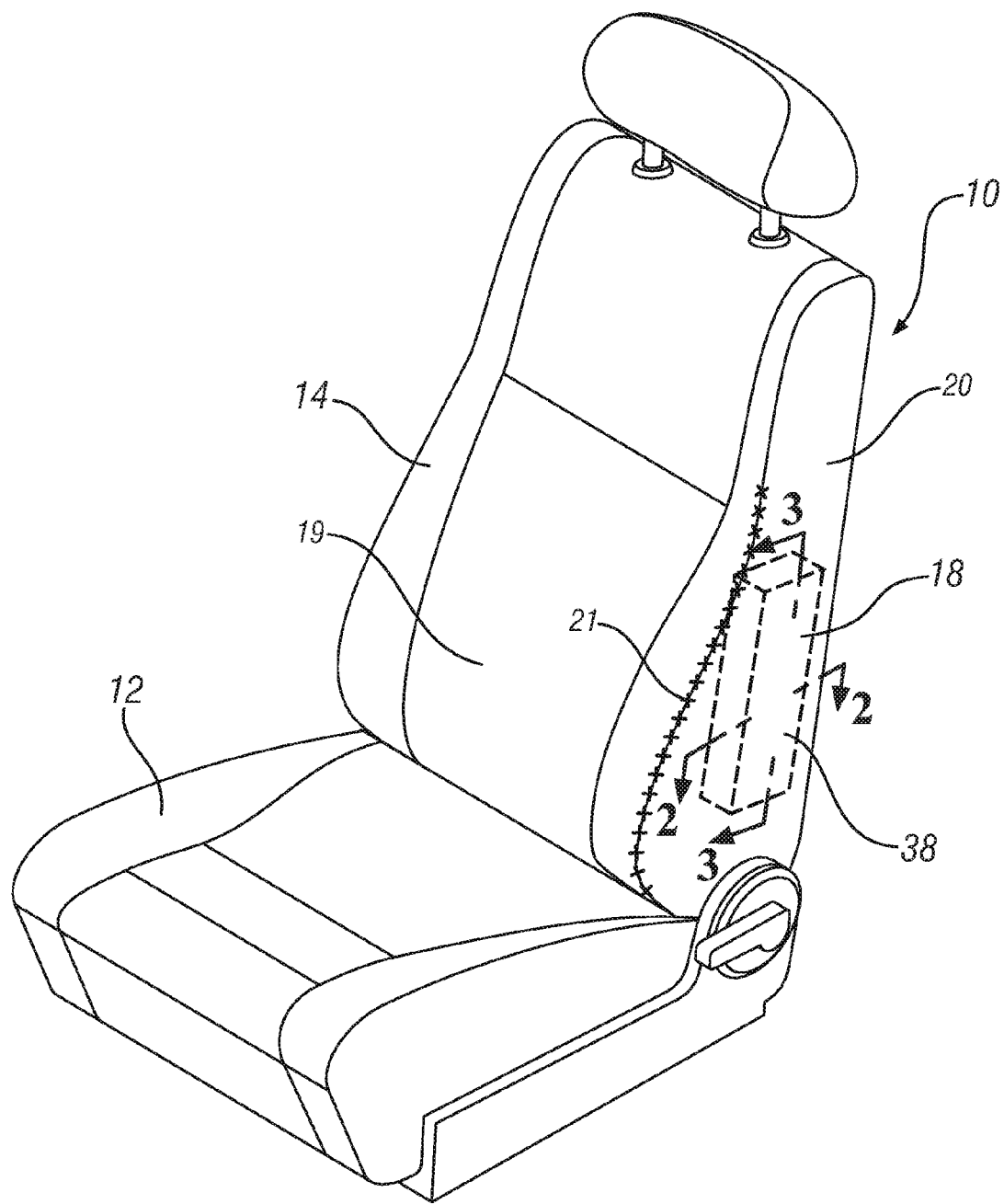
FIG. 1 is a perspective view of a vehicle seat having a side impact airbag.

Referring to FIG. 1, a vehicle seat 10 is shown and includes a seat bottom portion 12 and a seat back portion 14. An airbag assembly, generally indicated at 18, is concealed beneath a seat covering fabric that includes a front panel 19 and a side panel 20 joined at a separable seam 21 that joins the outboard side edge of the seat back 14.

Figure 2:
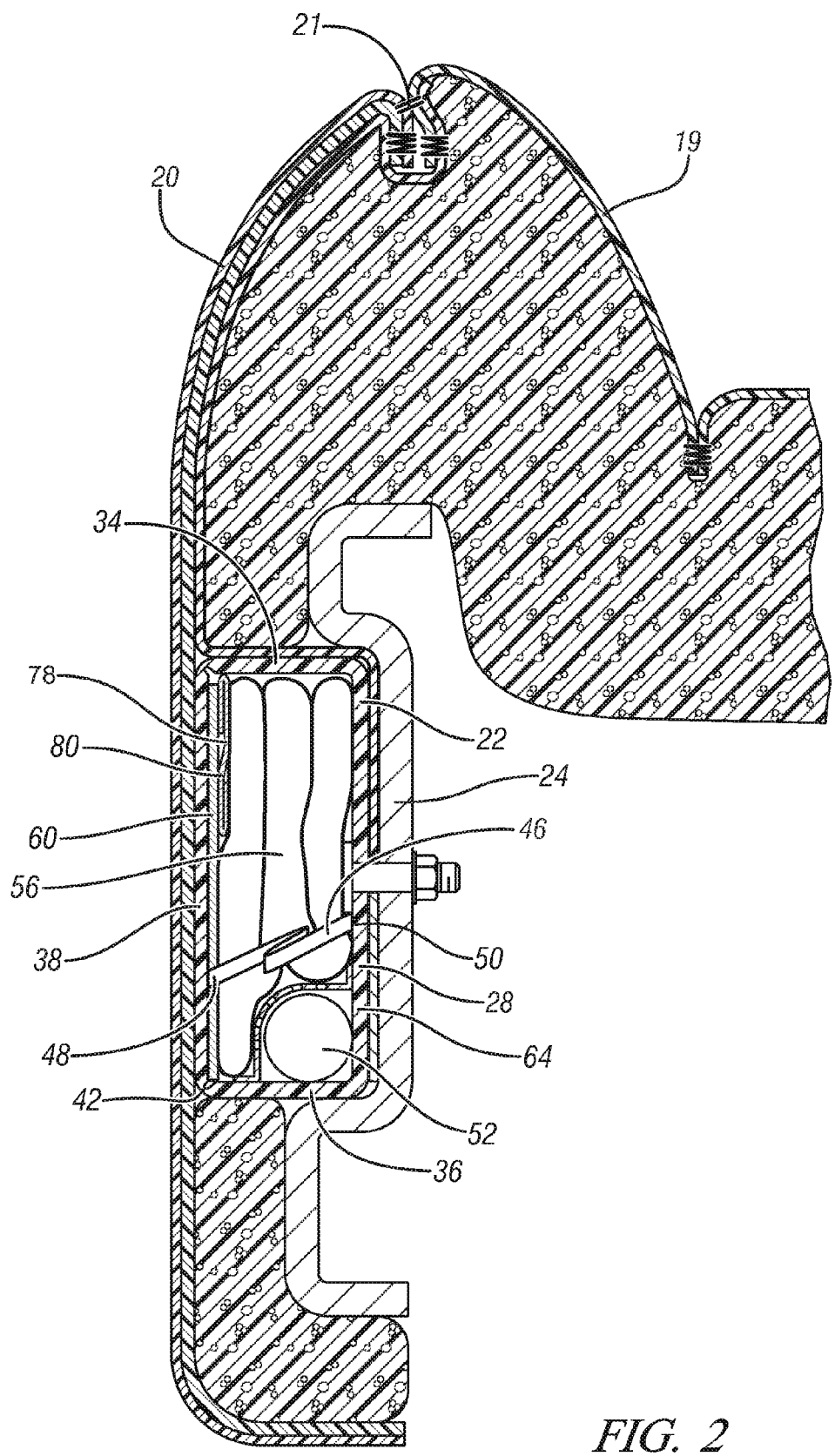
FIG. 2 is a section view taken in the direction of arrows 2-2 of FIG. 1.
Figure 3:
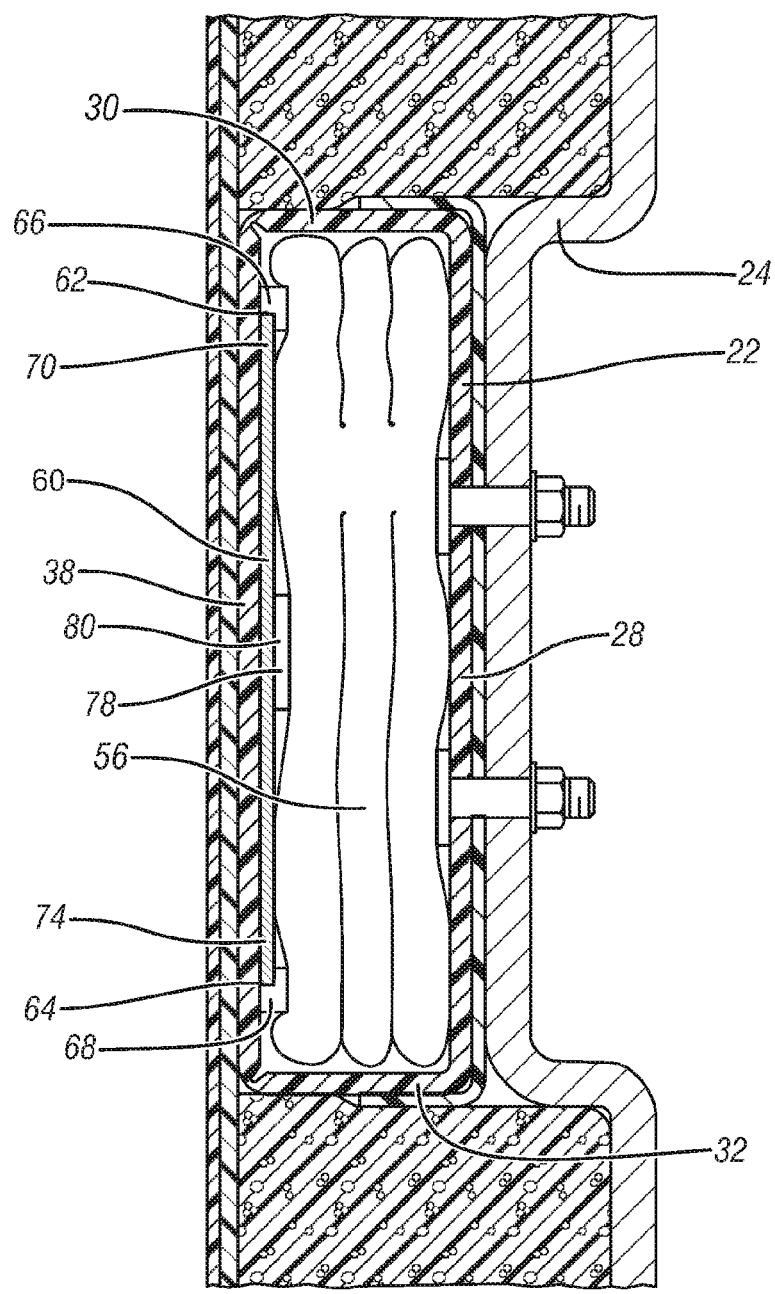
FIG. 3 is a section view taken in the direction of arrows 3-3 of FIG. 1.
Figure 5:
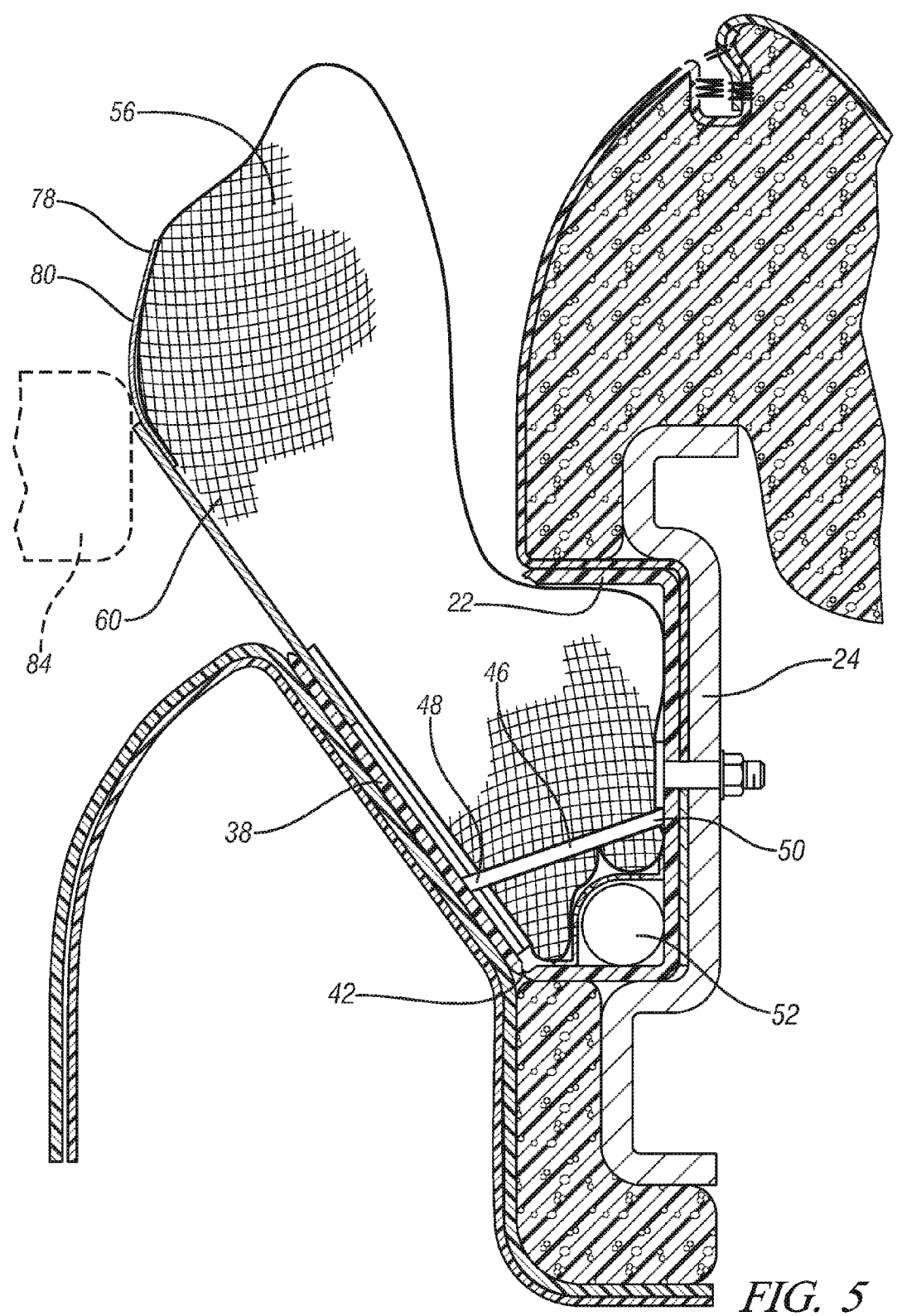
FIG. 5 is a view similar to FIG. 2 but showing the airbag having been deployed.

Referring to FIGS. 2 and 3, it is seen that an airbag housing 22 is mounted on a seat frame 24. Airbag housing 22 is a box like structure including a base wall 28, top wall 30, bottom wall 32, front wall 34, and rear wall 36. The box shaped structure of the housing 22 opens outwardly away from the seat frame 24. A door 38 is pivotally mounted on the rear wall 36 of the housing 22 by a hinge pivot 42. The housing 22 and its door 38 can be constructed of metal or plastic. Hinge pivot 42 can be any known type of hinge including, in the case of a plastic housing, a living hinge. As shown in FIG. 5, a door check strap 46 has an outer end 48 attached to the door 38 and an inner end 50 attached to the housing 22 for limiting the pivoting movement of the door 38. Inflator 52 is mounted within the housing 22.

FIGS. 2 and 3 also show an extension panel 60 that is mounted on the inside of the door 38 by a pair of linear track mechanisms including an upper track mechanism 62 and a lower track mechanism 64. As seen in FIG. 3, the upper track mechanism 62 is an upper track 66 that is formed integrally with the door 38 and reaches into the housing 22 to capture an upper edge portion 70 of the extension panel 60. Lower track mechanism 64 is likewise a lower track 68 integrally constructed with the door 38 and capturing a lower edge portion 74 of the extension panel 60. FIG. 2 also shows an extension mechanism 78 for moving the extension panel 60 to an extended position relative the door 38. The extension mechanism 78 is a tether strap 80 that has one end attached to the extension panel 60 and the other end attached to an airbag 56.

Figure 4:
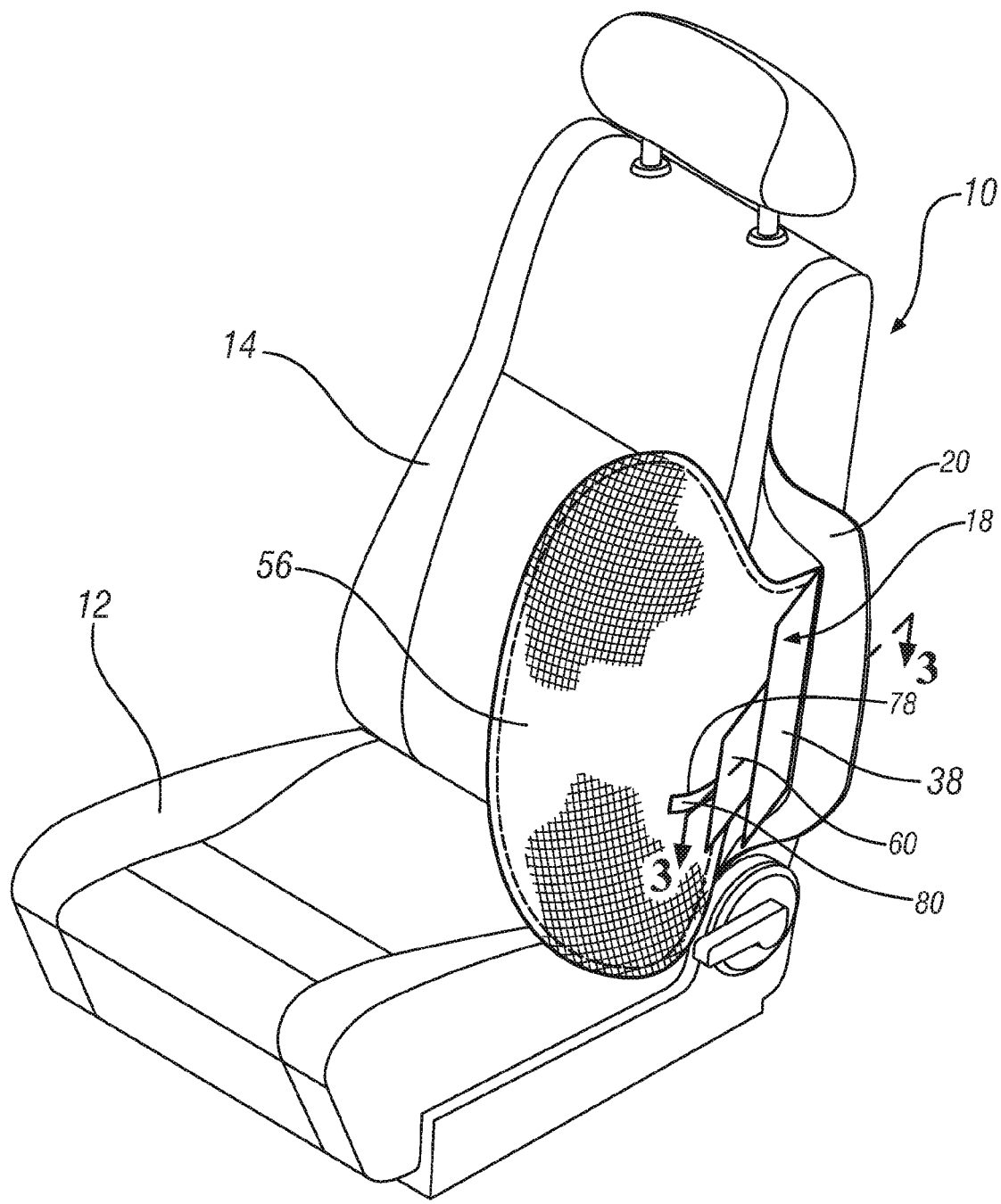
FIG. 4 is a view similar to FIG. 1 but showing the airbag having been deployed.

Referring now to FIGS. 4 and 5, the airbag construction of FIGS. 1, 2, and 3 is shown in the deployed condition. In particular, the deployment of the airbag 56 causes the airbag 56 to push the door 38 outwardly as permitted by its pivoting around the hinge pivot 42 and the separation of the separable seam 21. The outward movement is limited by the length of the door check strap 46. As the airbag 56 breaks out of the housing 22, the airbag 56 projects forwardly and the tether 80 acts to pull the extension panel 60 forwardly along the upper track mechanism 62 and lower track mechanism 64 to an extended position shown in FIGS. 4 and 5 in which the extension panel 60 is seen to have effectively nearly doubled the length of the door 38. Thus, the door 38 and the effective added length contributed by the extension panel 60 will result in an extended length of door against which the inflating airbag 56 will react so that the airbag 56 is effectively guided and stabilized during its deployment and during its loading against the occupant.

As seen in FIG. 5, the extension panel 60, or the door 38 can come into engagement with an adjacent vehicle structure 84 to thereby stop the outward pivoting movement of the door 38 and extension panel 60 to provide further stabilization of the airbag deployment. The adjacent vehicle structure 84 can be the vehicle door, or the vehicle pillar, or an armrest, or an adjacent seat, or window or steering wheel, or other vehicle structure.

Figure 6:
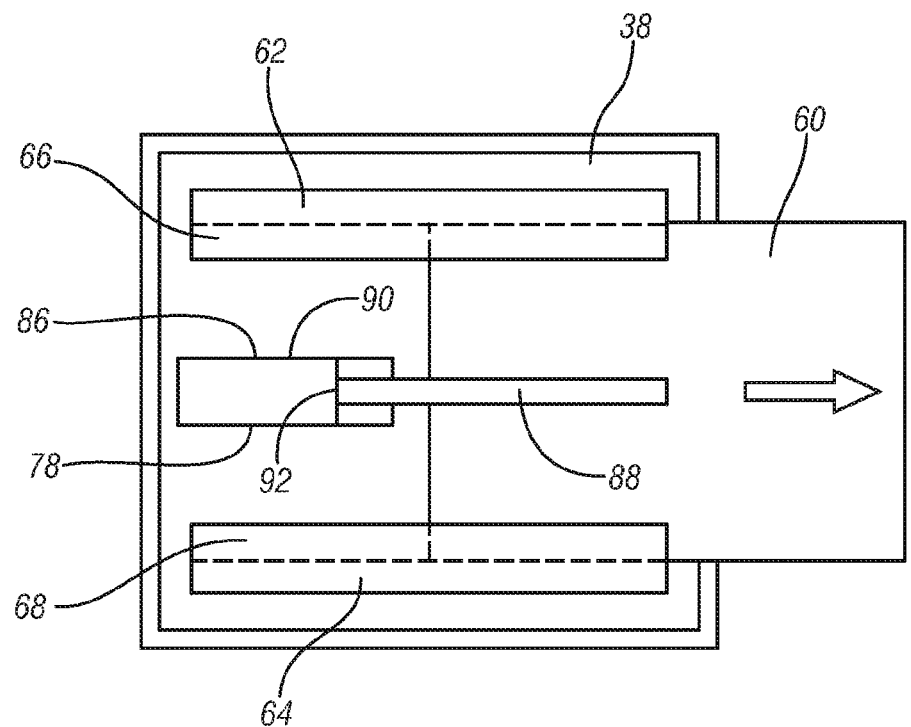
FIG. 6 is a view of the interior of the door and extension panel with an extending cylinder for extending the extension panel.

Referring to FIG. 6, another embodiment of an airbag door 38 and extension panel 60 is shown in which the airbag door 38 has an upper track mechanism 62 and a lower track mechanism 64, including an upper track 66 and lower track 68 identical to that of FIGS. 1-5. In FIG. 6 the extension mechanism 78 is an extendable cylinder 86 including a piston rod 88, a cylinder 90, and a piston 92 attached to the piston rod 88 and slideable within the cylinder 90. The cylinder is mounted on either the door 38 or the housing 22. The piston rod 88 is attached to the extension panel 60. The piston 92 is moveable within the cylinder 90 by an increased pressure that can be provided either by ducting inflation gas from the inflator 52 or by activating a pyrotechnic charge, not shown, housed in the cylinder 90, or by the rapid entry of compressed fluid or gas into the cylinder 90. In FIG. 6 the extending movement of the door 38 can be checked by the piston 92 reaching the end of its travel within the cylinder 90. As an alternative, the extendible cylinder 86 can be mounted to the housing at one end and the extension panel at the other end so that the extendible cylinder can also be used to help open the deployment door during or prior to air bag deployment. The extension panel to deployment door interface could have higher friction or some breakable/deformable interferences so that the door would be encouraged to open during piston movement before the extension panel travels too much relative to the door.

Figure 7:
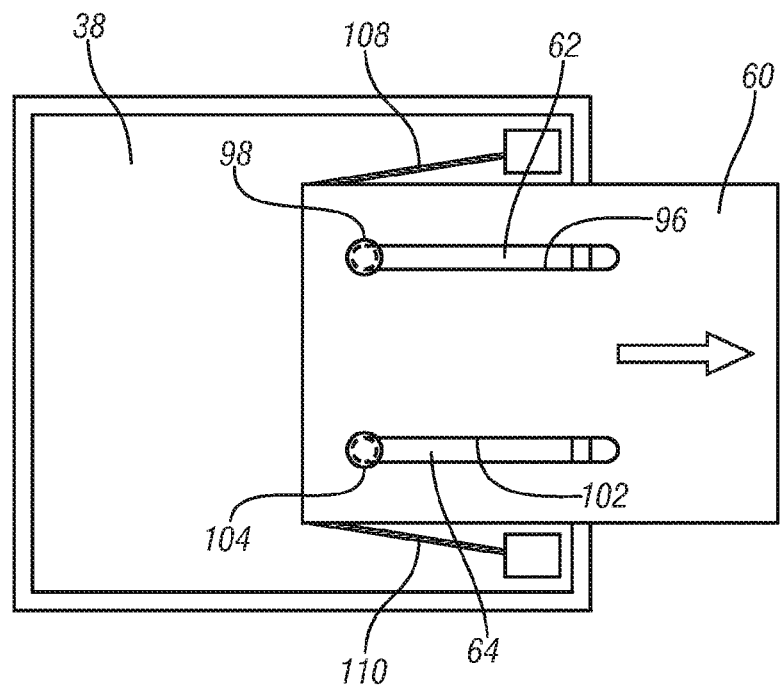
FIG. 7 is a view similar to FIG. 6 but showing an alternative track mechanism and the use of an SMA wire to move the extension panel to the extended position.

FIG. 7 shows another embodiment of the invention in which the extension panel 60 is mounted on the door 38 by an upper track mechanism 62 that is comprised of a slot 96 provided in the extension panel 60 and a rivet 98 extending from the door 38 into the slot 96. Likewise, the lower track mechanism 64 includes a slot 102 provided in the extension panel 60 and a rivet 104 provided on the door 38 and extending through the slot 102. In FIG. 7 a shaped memory alloy (SMA) wire 108 reaches between the end of the door 38 and the inboard end of the extension panel 60. Another SMA wire 110 is provided at the bottom of the door 38 and extends between the door 38 and the extension panel 60. SMA wires are known in the industry and have the characteristic of being abruptly shortened in length upon the application of an electrical current to the SMA wire. Thus, the SMA wire is a lightweight, solid-state alternative to conventional actuators, such as hydraulic, pneumatic, and motor-based systems. In FIG. 7 the extension panel 60 has been moved to its extended position by the application of electrical current to the SMA wires 108 and 110. Also, in FIG. 7, the extending movement of the extension panel 60 has been checked by the engagement of the ends of the slots 96 and 102 with the rivets 98 and 104 of the door 38.

Figure 8:
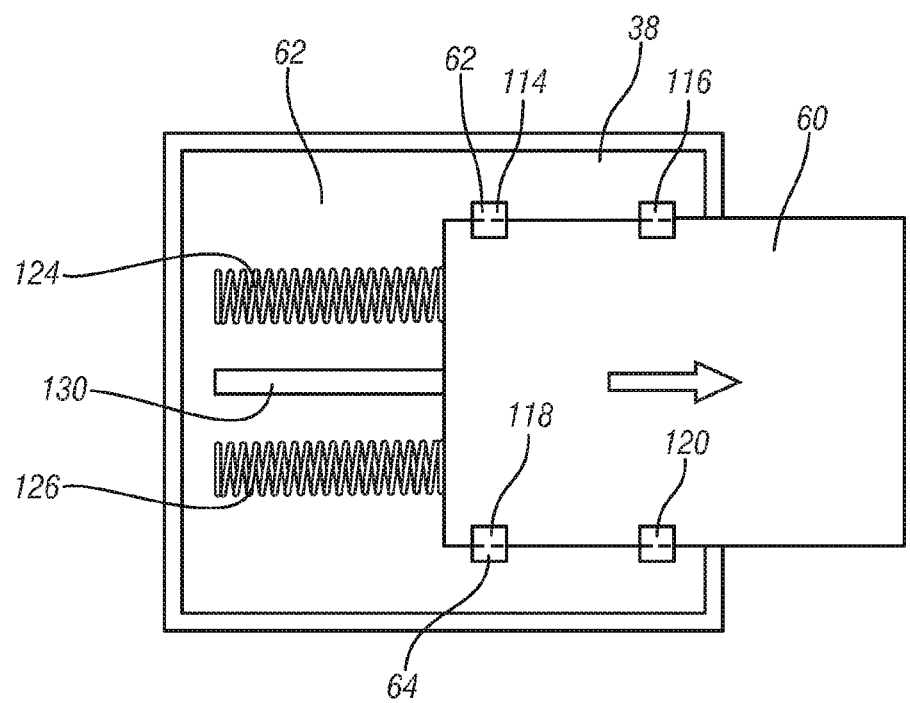
FIG. 8 is another view of the inside of the airbag door showing a pair of coil compression springs to move the door to the extended position and a check strap for stopping the extending movement.

FIG. 8 shows another arrangement of the door 38 and the extension panel 60 in which the upper track mechanism 62 includes a pair of spaced-apart angle brackets 114 and 116 that are attached to the door 38 and overhang the upper edge of the extension panel 60. The lower track mechanism 64 is similarly constructed of a pair of angle brackets 118 and 120 that reach around the bottom edge of the extension panel 60. In FIG. 8, the extension panel 60 has been moved to its extended position by a pair of coil compression springs 124 and 126 that act between the extension panel 60 and the door 38. In FIG. 8, the extending movement of the extension panel 60 is limited by a door check strap 130 that has one end connected to the extension panel 60 and the other end connected to either the door 38 or the airbag housing 22. As an alternative the coil compression springs 124 and 126 can be mounted to the housing at one end and the extension panel at the other end so that the coil compression springs can also be used to help open the deployment door during or prior to air bag deployment. The extension panel to deployment door interface could have higher friction or some breakable/deformable interference so that the door would be encouraged to open before the extension panel travels too much relative to the door.

Figure 9:
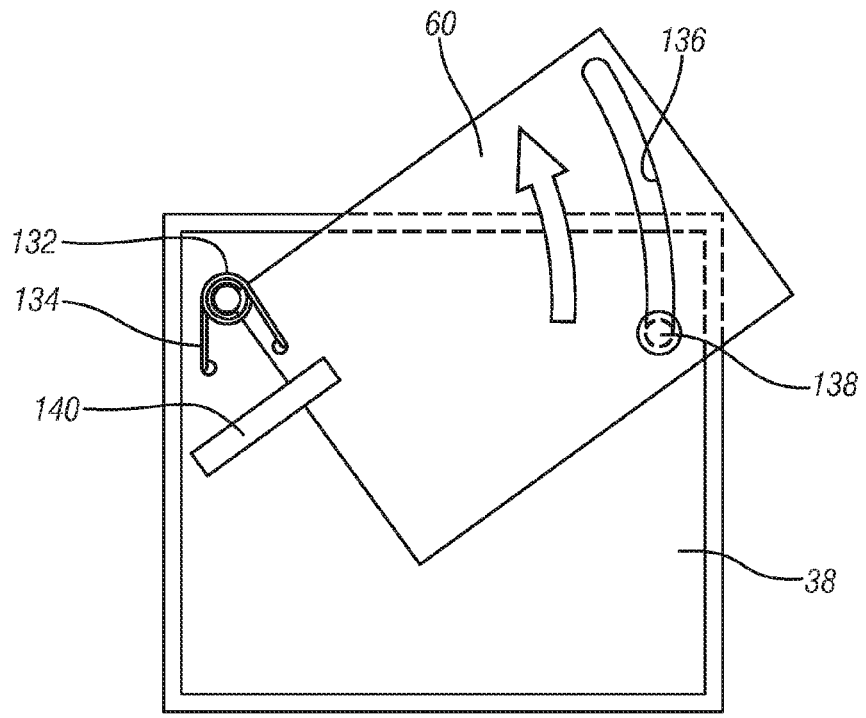
FIG. 9 shows an alternative extension panel pivotally mounted on the cover for swinging movement to an extended position.

Referring to FIG. 9, an alternative embodiment is shown in which the extension panel 60 is pivotally mounted on the door 38 by a pivot 132. A torsion spring 134 circles the pivot 132 and has urged the extension panel 60 to its extended position in which the extension panel 60 has pivoted upwardly to effectively extend the height of the door 38 in the vertical direction. In FIG. 9, a radial slot 136 in the extension panel 60 receives a rivet 138 attached to the door 38. The radial slot 136 and the rivet 138 are effective to guide and stabilize the swinging movement of the extension panel 60 around the pivot 132, and also stop the movement of the extension panel 60 at its extended position of FIG. 9. Thus, the pivot 132, the slot 136 and the rivet 138 cooperate to define the track mechanism for determining the movement of the extension panel 60, and the torsion spring 134 provides the extension mechanism for moving the extension panel 60 to the extended position as the door 38 pivots out of the housing 22. In addition, a door check strap 140 can be provided having ends connected to the door 38 and extension panel 60 to limit the swinging movement of the extension panel 60.

Although FIG. 9 shows the extension panel 60 pivoted at the top edge of the door 38, it will be understood that the extension panel 60 can, as an alternative, be pivoted to the lower edge of the door 38. Alternatively, two extension panels 60 can be pivoted to the door 38, with one pivoting upwardly and another extension panel 60 pivoting downwardly. In the alternative, the pivot 132 can be provided at the forward most edge of the door 38 so that the extension panel 60 will pivot in the direction to extend the effective length of the door 38. Furthermore, the pivoting extension panel 60 shown in FIG. 9 can be added to the embodiment shown in FIGS. 1-6 so that the dimensions of the door 38 can be simultaneously extended in the upward direction by one of the extension panels and in the forward direction by the other extension panel.

Figure 10:
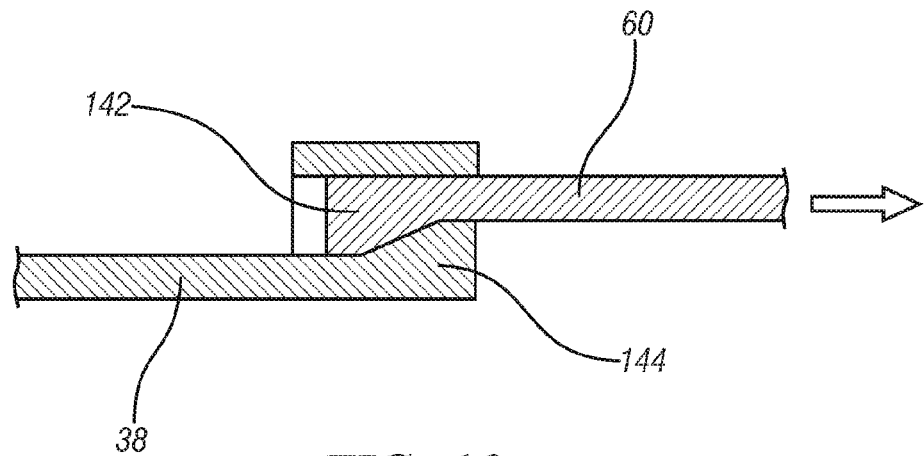
FIG. 10 shows a stop mechanism for stopping the extending movement of the extension panel.
Figure 11:
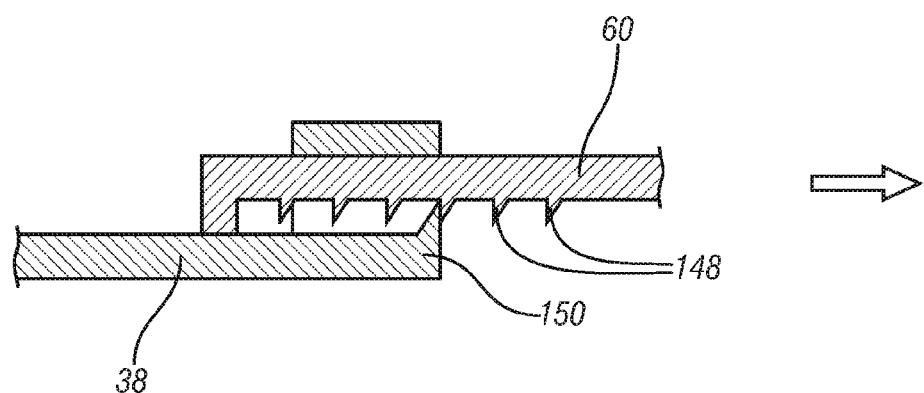
FIG. 11 shows another stop mechanism for limiting the movement of the door and also having ratchets for preventing reverse movement of the extension panel.
Figure 12:
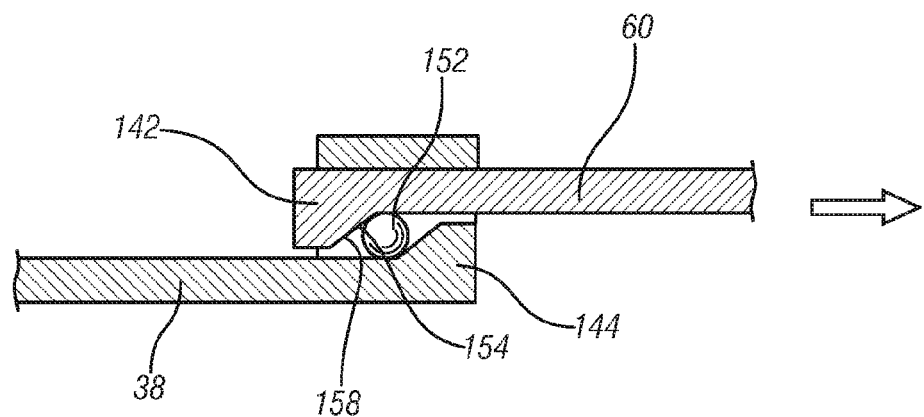
FIG. 12 is another stop mechanism for limiting the extending movement of the door.

FIGS. 10, 11, and 12 show various alternative stop mechanisms for limiting the extending movement of the extension panel 60 relative to the door. In FIG. 10 an abutment 142 carried by the extension panel 60 has come into engagement with an abutment stop 144 carried by the door 38 to limit the extending movement of the extension panel 60. In FIG. 11, a series of ratchet fingers 148 are provided on the extension panel 60 and are progressively engaged by a ratchet finger 150 provided on the door 38, thereby providing a one-way ratcheting mechanism so as to prevent any retracting movement of the extension panel 60 during the airbag deployment. In FIG. 12, a locking ball 152 is captured within a ramped recess 154 of the door 38 and becomes engaged by a ramp surface 158 of the extension panel 60 to stop the extending motion of the extension panel 60 relative to the door 38.

It will be understood and appreciated that although FIG. 1 shows the separable seam 21 located at the juncture of the front panel 19 and the side panel 20, the separable seam 21 can alternatively be located entirely in the side panel 20. Furthermore, although the airbag assembly is shown as concealed beneath the seat cover fabric, the airbag assembly can be mounted with the airbag door exposed on the side of the seat rather than being concealed under the seat cover.

It should also be understood and appreciated that the embodiments shown illustrate a side air bag mounted in a vehicle seat application. This concept can be applied to other air bag locations such as instrument panel mounted passenger air bags, steering wheel mounted driver air bags, vehicle door mounted side impact air bags, roof-rail mounted, and other air bag locations.

What is claimed is:

1. Apparatus for stabilizing the deployment of an airbag comprising:
    an airbag housing in which a folded up airbag is housed and having an open side through which the airbag is deployed;
    a door pivoted to the housing and closing the open side and overlying the folded up airbag, said door being pivoted open by the deploying airbag;
    an extension panel mounted on the door by a track mechanism so that the extension panel is movable between a normal retracted position along side the door and an extended position in which the extension panel extends beyond the door;
    and an extension mechanism for causing the extension panel to be moved to the extended position when the airbag is deploying so that the door and the extension panel direct and stabilize the deploying airbag.

2. The apparatus of claim 1 further comprising said extension mechanism being a tether having an end attached to the airbag and an end attached to the extension panel so that the deploying air bag pulls on the tether which in turn pulls the extension panel to the extended position.

3. The apparatus of claim 2 further comprising a door check strap having an end connected to the door and an end connected to the housing to limit the opening movement of the door.

4. The apparatus of claim 1 further comprising said extension mechanism being an SMA wire having an end connected to the door and an end connected to the extension panel so that electrical current applied to the SMA wire shortens the wire to pull the extension panel to the extended position.

5. The apparatus of claim 1 further comprising said extension mechanism acting between the housing and the extension panel so that the extension mechanism will also urge the door to the open position.

6. The apparatus of claim 1 further comprising said extension mechanism being an extendible cylinder that acts between the door and the extension panel for moving the extension panel to the extended position upon an increase in pressure within the extendible cylinder.

7. The apparatus of claim 6 further comprising said increase in pressure being provided by one of ducting inflation gas from an inflator into the extendible cylinder, by activating a pyrotechnic charge, or by the rapid entry of compressed fluid or gas into the extendible cylinder.

8. The apparatus of claim 6 further comprising a door check strap having an end connected to the door and an end connected to the housing to limit the opening movement of the door.

9. The apparatus of claim 1 further comprising said extension mechanism being a spring.

10. The apparatus of claim 1 further comprising said track mechanism being a linear track and the extension mechanism being a coil spring acting between the extension panel and either the housing or the door.

11. The apparatus of claim 1 further comprising the track mechanism being a pivot provided between the door and the extension panel and the extension mechanism being a torsion spring surrounding the pivot.

12. The apparatus of claim 1 further comprising a one way ratchet mechanism acting between the door and the extension panel to permit the extending movement of the extension panel relative to the door but prevent movement of the extension panel in the retracting direction.

13. The apparatus of claim 1 further comprising the track mechanism mounting the door for linear movement in a direction that effectively extends the length of the door.

14. The apparatus of claim 1 further comprising the track mechanism being a pivot mounting the extension panel for rotary movement relative the door so that the extended position of the extension panel effectively extends the height of the door.

15. The apparatus of claim 1 further comprising the airbag being mounted in a vehicle having structure adjacent the airbag so that upon movement of the extension panel to the extended position the extension panel engages with the vehicle structure to limit the opening movement of the door.

16. The apparatus of claim 1 further comprising a door check strap having an end connected to the door and an end connected to the housing to limit the opening movement of the door, and the airbag being mounted in a vehicle having structure adjacent the airbag so that upon movement of the extension panel to the extended position the extension panel engages with the vehicle structure to assist the door check strap in limiting the opening movement of the door.

17. Apparatus for stabilizing the deployment of an airbag comprising:
    an airbag housing in which a folded up airbag is housed and having an open side through which the airbag is deployed;
    a door pivoted to the housing and closing the open side and overlying the folded up airbag, said door being pivoted open by the deploying airbag;
    an extension panel;
    a track mechanism movably mounting the extension panel on the door for movement between a normal retracted position along side the door and an extended position in which the extension panel extends beyond the door in at least one direction of airbag deployment;
    and an extension mechanism moving the extension panel from the retracted position to the extended position when the airbag is deployed so that the extension panel extends the effective dimension of the door in the at least one direction of airbag deployment.

18. The apparatus of claim 17 further comprising said extension mechanism being a tether having an end attached to the airbag and an end attached to the extension panel so that the deploying air bag pulls on the tether which in turn pulls the extension panel to the extended position 19. Apparatus for stabilizing the deployment of an airbag comprising:
- an airbag housing in which a folded up airbag is housed and having a open side through which the airbag is deployed;
- a door pivoted to the housing and closing the open side and overlying the folded up airbag, said door being pivoted open by the deploying airbag;
- an extension panel;
- a track mechanism movably mounting the extension panel on the door for movement between a normal retracted position along side the door and an extended position in which the extension panel extends beyond the door in the direction of airbag deployment;
- a tether having an end attached to the airbag and an end attached to the extension panel so that the deploying air bag pulls on the tether which in turn pulls the extension panel to the extended position;
- and a travel stop to limit the motion of the extension panel.

20. The apparatus of claim 19 further comprising the airbag being mounted in a vehicle having structure adjacent the airbag so that upon movement of the extension panel to the extended position the extension panel engages with the vehicle structure to limit the opening movement of the door.

* * * * *